United States Patent [19]

Marshall

[11] Patent Number: 5,722,350
[45] Date of Patent: Mar. 3, 1998

[54] DIP CUP AND METHOD OF TREATINNG THE TEATS OF ANIMALS

[75] Inventor: Barry Reginald Marshall, Oxford, England

[73] Assignee: Ambic Equipment Limited, Oxon, England

[21] Appl. No.: 618,550

[22] Filed: Mar. 20, 1996

[30] Foreign Application Priority Data

Mar. 24, 1995 [GB] United Kingdom ............... 9506058
Apr. 13, 1995 [GB] United Kingdom ............... 9507695

[51] Int. Cl.⁶ .................... A01K 29/00; B65D 37/00
[52] U.S. Cl. ................... 119/673; 222/190; 222/205
[58] Field of Search .................... 119/651, 670, 119/673; 222/212, 485.1, 190, 205, 207, 209

[56] References Cited

U.S. PATENT DOCUMENTS

| | | | |
|---|---|---|---|
| 2,159,656 | 5/1939 | Focht | 222/205 |
| 2,532,088 | 11/1950 | Cordis | 119/670 |
| 2,599,446 | 6/1952 | Greene | 222/205 |
| 3,246,807 | 4/1966 | Micallef | 222/205 |
| 3,713,423 | 1/1973 | Sparr, Sr. | 119/670 |
| 3,828,776 | 8/1974 | Span, Sr. | 119/673 |
| 3,874,561 | 4/1975 | Zackheim et al. | |
| 3,917,119 | 11/1975 | Kahn | 222/205 |
| 3,921,860 | 11/1975 | Zackheim | |
| 4,305,346 | 12/1981 | Span, Sr. | 119/670 |
| 4,928,857 | 5/1990 | Ecker | 222/190 |
| 4,970,992 | 11/1990 | Aiken | |
| 5,037,006 | 8/1991 | Kock | 222/190 |
| 5,269,444 | 12/1993 | Wright | 222/190 |
| 5,379,724 | 1/1995 | Dee et al. | 119/673 |
| 5,381,930 | 1/1995 | Kalabakas | 222/205 |

*Primary Examiner*—John G. Weiss
*Assistant Examiner*—David J. Cho
*Attorney, Agent, or Firm*—Young & Thompson

[57] ABSTRACT

A dip cup comprises a compressible container for containing a liquid including a foaming agent, a cup mounted on the container, a foaming device for drawing air into liquid in the container as the container expands from a compressed state to cause the liquid to foam, and passage means between the container and the cup and through which foam can pass from the container to the cup as the container is compressed. The foaming device is arranged to draw air into liquid in the container from the exterior of the dip cup and includes a valve for preventing the contents of the container from being expelled via the foaming device when the container is compressed. A one way valve may be provided in the passage means to prevent the return of foam from the cup to the container.

9 Claims, 1 Drawing Sheet

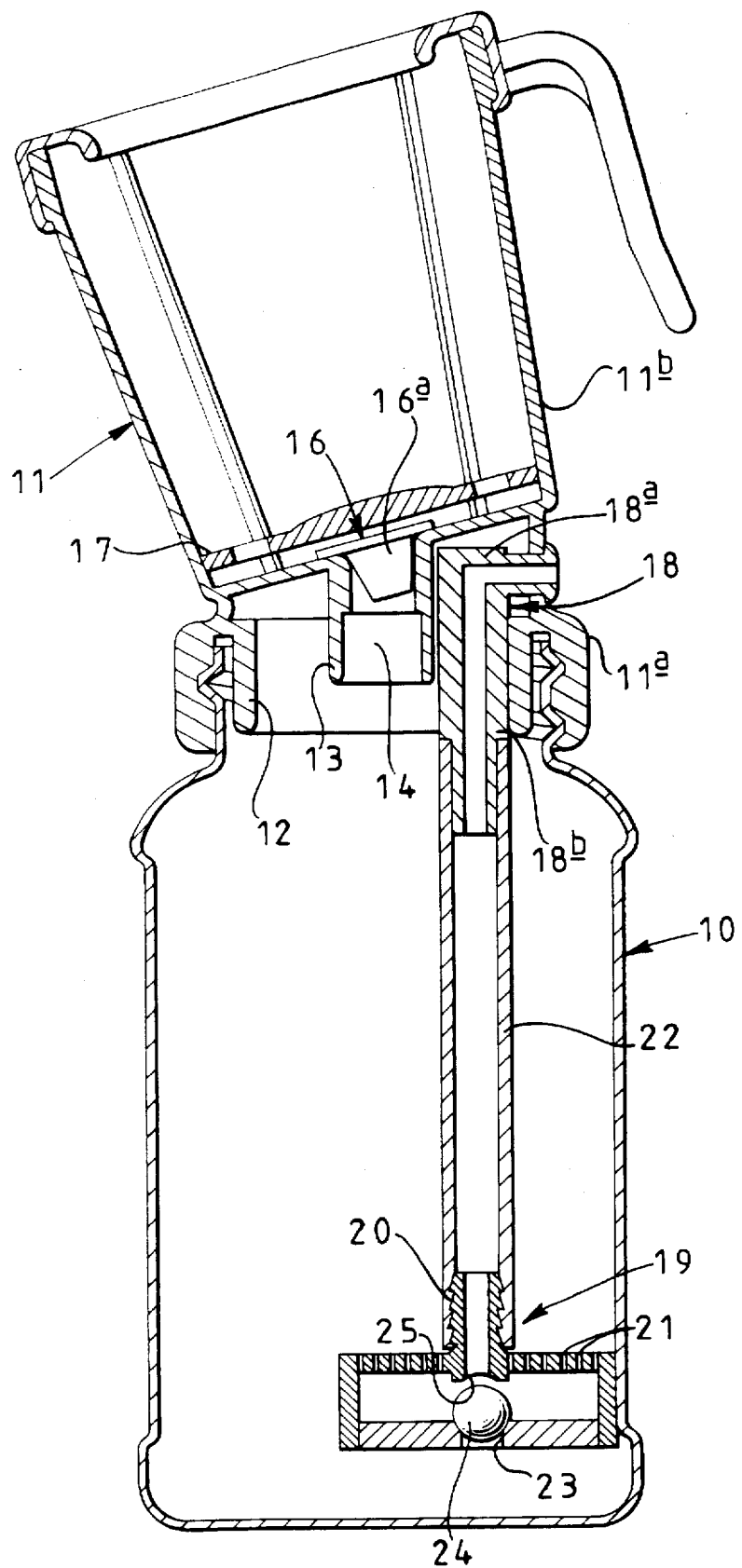

DIP CUP AND METHOD OF TREATINNG THE TEATS OF ANIMALS

INTRODUCTION

1. Field of the Invention

This invention relates to a method of treating the teats of animals and to a dip cup for treating the teats of animals, typically cows, such as with a disinfectant.

2. Description of the Prior Art

It is known to provide dip cups for treating the teats of animals, typically cows, with a liquid disinfectant immediately prior to and/or immediately after milking. Some known dip cups comprise a compressible container and a rigid cup threadably engaged with the open end of the container. The cup of known dip cups is frusto conical and has an opening in its base. Liquid in the container can be discharged through the opening into the cup by compressing the container and, whilst holding the container in the compressed state, the cup can be placed over teats to dip the teats in the disinfectant. The liquid will return to the container when the container is no longer held in a compressed condition.

These known dip cups work quite satisfactorily but there are conceived advantages in dipping the teats in a foam rather than a liquid. Firstly, foam is more visible to the eye than liquid and, therefore, the use of foam will provide a user with visible confirmation that all teats have been dipped. Also, it is thought that by using foam, less disinfectant will be used. Foam may also have a greater residue on the teat of its active ingredients, which will therefore remain on the teat for a longer period of time.

SUMMARY OF THE INVENTION

Accordingly, in one aspect, the invention provides a method of treating the teats of animals with a disinfectant in foamed form.

According to a second aspect of the present invention, there is provided a dip cup comprising a compressible container for containing a liquid including a foaming agent, a cup mounted on the container, foaming means for drawing air into liquid in the container as the container expands from a compressed state to cause the liquid to foam, and passage means between the container and the cup and through which foam can pass from the container to the cup as the container is compressed.

Preferably, the cup is releasably connected to the container, such as by a screw threaded connection therebetween.

Preferably, the passage means includes means at least restricting the return of foam from the cup to the container. In this case, the restricting means, preferably, comprises a one way valve.

Preferably, the foaming means is arranged to draw air into liquid in the container from the exterior of the dip cup and includes means for preventing the contents of the container from being expelled via the foaming means when the container is compressed.

The foaming means may comprise a manifold disposed in the container adjacent to the bottom thereof, the manifold having an air inlet communicating with the exterior of the dip cup and a plurality of outlet apertures for dispersing air drawn in through the air inlet into the liquid in the container. In this case, the air inlet may communicate with the exterior of the dip cup via an inlet passage in the cup and a flexible tube connecting the inlet passage to the air inlet of the manifold. Preferably, the manifold includes a one way valve for preventing the contents of the container from being expelled via the foaming means as the container is compressed.

Preferably, the cup has a base portion releasably engaged with the top of the container and an upper generally frusto conical portion which may be inclined with respect to the base portion.

The invention will now be more particularly described by way of example with reference to the accompanying drawing.

BRIEF DESCRIPTION OF THE DRAWING

The drawing is a sectional view through one embodiment of a dip cup according to the present invention.

DESCRIPTION OF THE PREFERRED EMBODIMENT

Referring to the drawing, the dip cup shown therein comprises a translucent, compressible, plastics container, in the form of an open topped bottle 10 and a rigid plastic cup 11 which is threadably engaged with the open upper end of the bottle 10.

The cup 11 has a generally cylindrical base portion 11a which threadably engages with the open end of the bottle 10 and an upper, generally frusto conical portion 11b which is inclined at a small angle with respect to the base portion 11a.

The base portion 11a has an internal annular flange 12 which fits inside the upper externally threaded portion of the bottle 10 to give the connection between the bottle and the cup added rigidity.

The base portion 11a of the cup also has a depending central collar 13 which defines an opening 14. A valve member 16 seats against the upper end of the opening 14 and has a stem portion 16a which extends downwards into the collar 13. An apertured disc 17 is snap fittably engaged with the base portion 11a and this disc 17 serves to limit upward displacement of the valve member 16 away from its seated position.

An air inlet elbow 18 is moulded into the cup 11 and has one limb 18a projecting through a side wall of the cup 11 so as to communicate with the exterior of the dip cup and a second limb 18b which projects downwardly between the annular flange 12 and the collar 13. The elbow 18 may be swivellable relative to the cup 11.

A foaming device 19 is disposed in the bottle 11 adjacent the bottom of the bottle. The foaming device 19 is in the form of a hollow disc shaped manifold having a central air inlet nipple 20 upstanding from its upper surface and a plurality of small air outer apertures 21 in its upper surface. These apertures 21 may be arranged in four equi-angularly spaced, radially extending rows.

The air inlet nipple 20 is connected to the lower end of the depending limb 18b of the air inlet elbow 18 by a flexible tube 22.

The manifold 19 has a central aperture 23 in its base coaxial with the air inlet nipple 20 and a one way valve in the form of a ball 24 which is located radially within the manifold and which is movable between the position shown in which it closes the aperture 23 and a position in which it seats in a frusto conical recess 25 at the lower end of the air inlet nipple 20.

In use, the container is partially filled with a liquid, typically a liquid disinfectant, containing a foaming agent.

In order to cause the liquid to foam up, the bottle 10 is compressed and then released several times. As the bottle is released from its compressed state air is drawn into the liquid in the bottle via the air inlet elbow 18, the flexible tube 22 and the manifold. The air passes through the air inlet nipple 20 and is dispersed into the liquid through the small outlet apertures 21 in the upper surface of the manifold. When the bottle is compressed liquid enters the manifold through the central aperture 23 in the base of the manifold and forces the ball 24 to seat in the frusto conical recess 25 thereby preventing liquid within the bottle 10 from being expelled via the air inlet elbow 18. Also, as the bottle is compressed, foam within the bottle is forced up through the opening 14 defined by the collar 13, past the valve member 16 which is unseated and through the apertures in the disc 17. The valve member 16 prevents the return of foam to the bottle and the foam therefore collects within the cup. After sufficient foam has collected in the cup, the cup can be placed over teats so that the teats are disinfected by the foam.

The embodiment described above is given by way of example only and various modifications will be apparent to persons skilled in the art without departing from the scope of the invention.

What is claimed is:

1. A dip cup comprising:

a compressible container for containing a liquid including a foaming agent;

a cup mounted on the container;

a foaming device for drawing air from an exterior of the dip cup into liquid in the container as the container expands from a compressed state to cause the liquid to foam, said foaming device having an air inlet nipple, a plurality of air outlet apertures adjacent to the air inlet nipple and communicating with an inside of the container, a central aperture coaxial with the air inlet nipple, and a one-way valve for closing one of the central aperture and the air inlet nipple; and passage means between the container and the cup and through which foam can pass from the container to the cup as the container is compressed.

2. The dip cup as claimed in claim 1, wherein the cup is releasably connected to the container.

3. The dip cup as claimed in claim 1, wherein the passage means includes means at least restricting the return of foam from the cup to the container.

4. The dip cup as claimed in claim 3, wherein the restricting means comprises a one way valve.

5. The dip cup as claimed in claim 1, wherein the cup has a base portion releasably engaged with the top of the container and an upper generally frusto conical portion.

6. The dip cup as claimed in claim 5, wherein the frusto conical portion is inclined with respect to the base portion.

7. A dip cup, comprising a compressible container for containing a liquid including a foaming agent, a cup mounted on the container, foaming means for drawing air into liquid in the container as the container expands from a compressed state to cause the liquid to foam, and passage means between the container and the cud and through which foam can pass from the container to the cup as the container is compressed, wherein the foaming means comprises a manifold disposed in the container adjacent to a bottom thereof, the manifold having an air inlet communicating with an exterior of the dip cup and a plurality of outlet apertures for dispersing air drawn in through the air inlet into the liquid in the container.

8. The dip cup as claimed in claim 7, wherein the air inlet communicates with the exterior of the dip cup via an inlet passage in the cup and a flexible tube connecting the inlet passage to the air inlet of the manifold.

9. The dip cup as claimed in claim 7, wherein the manifold includes a one way valve for preventing the contents of the container from being expelled via the foaming means as the container is compressed.

* * * * *